Aug. 2, 1927.  
E. H. WHEELER  
1,637,718  
NUT FACING ATTACHMENT FOR AUTOMATIC MACHINES  
Filed July 20, 1926   2 Sheets-Sheet 1
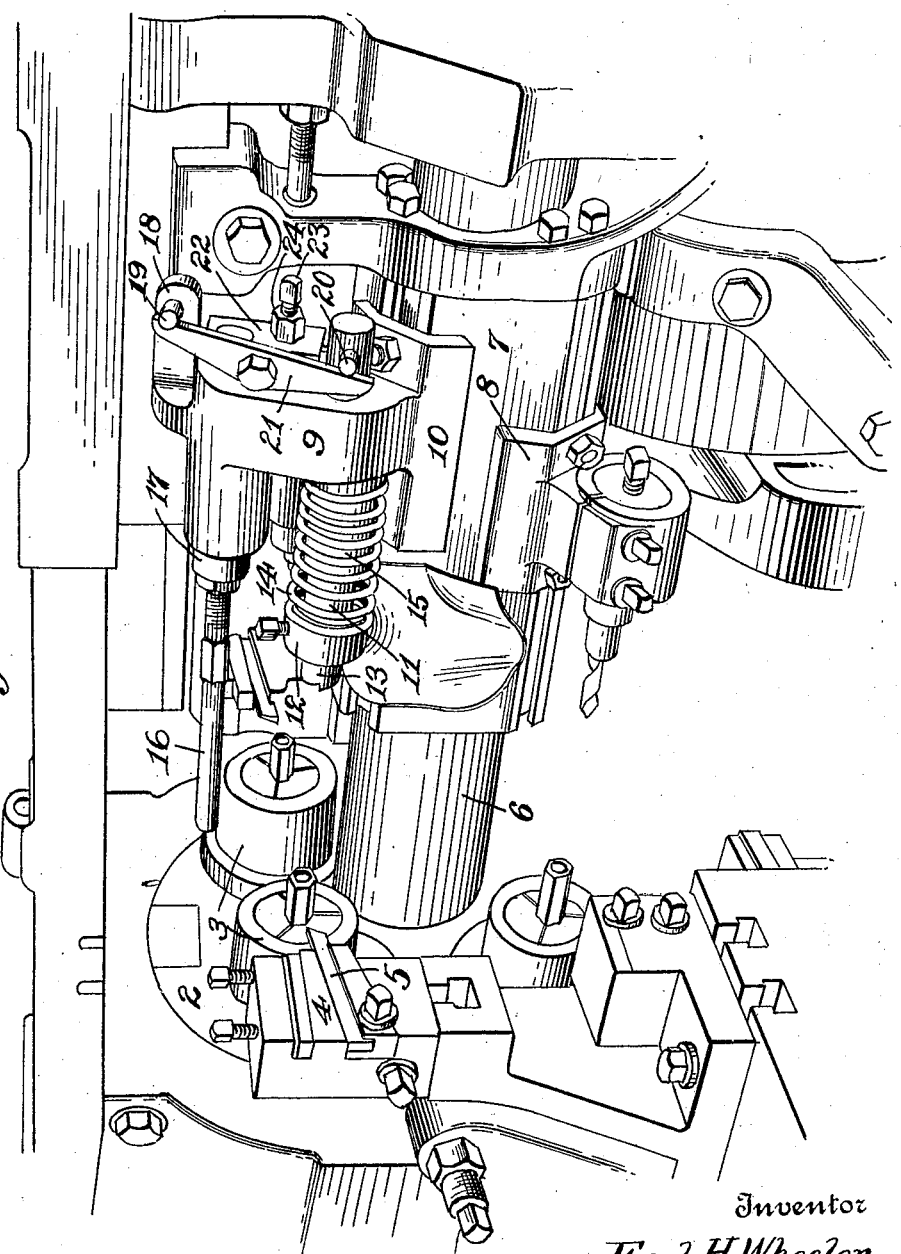
Inventor  
*Earl H. Wheeler*  
By his Attorney Aug. 2, 1927.
E. H. WHEELER
NUT FACING ATTACHMENT FOR AUTOMATIC MACHINES
Filed July 20, 1926  2 Sheets-Sheet 2
1,637,718
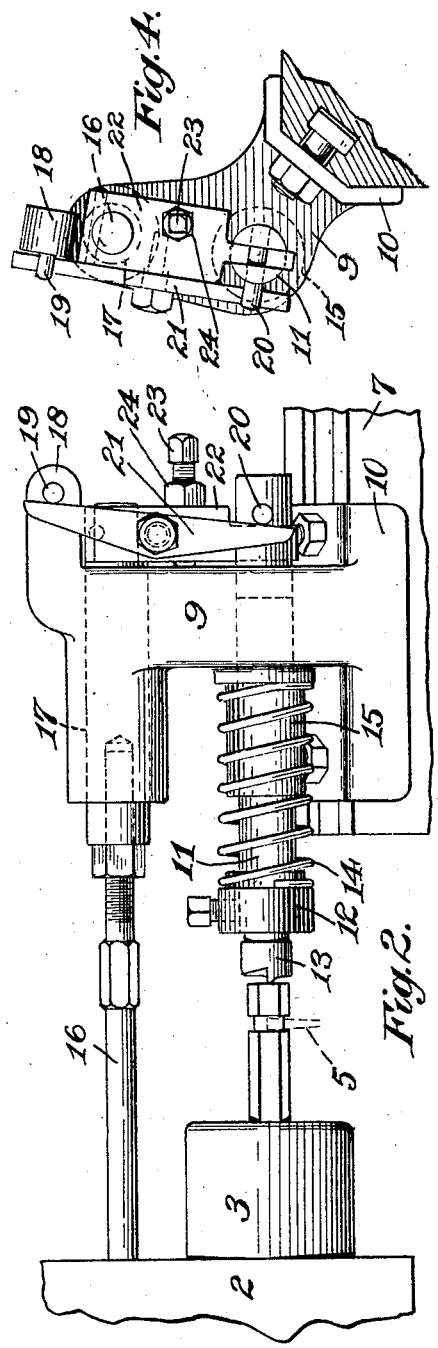
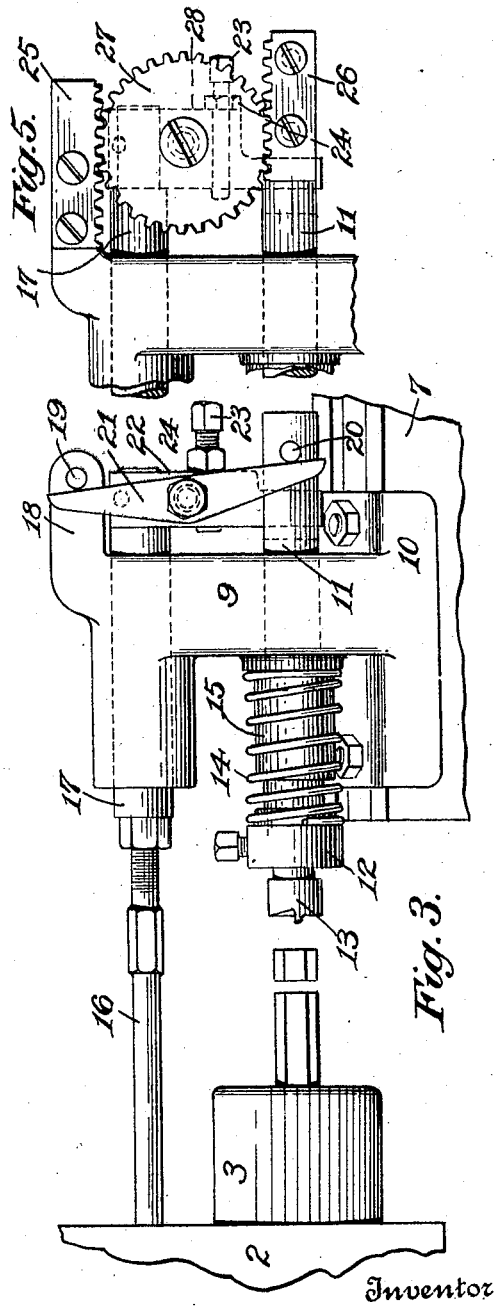
Inventor
Earl H. Wheeler,
By his Attorney Patented Aug. 2, 1927.

1,637,718

UNITED STATES PATENT OFFICE.

EARL H. WHEELER, OF WINDSOR, VERMONT, ASSIGNOR TO THE NATIONAL ACME COMPANY, OF CLEVELAND, OHIO, A CORPORATION OF OHIO.

NUT-FACING ATTACHMENT FOR AUTOMATIC MACHINES.

Application filed July 20, 1926. Serial No. 123,631.

This invention relates to machine tool attachments for use on tool slides such as those of multiple spindle machines, an object of the invention being to provide a nut facing attachment which will enable a nut blank to be quickly and properly faced while being cut off from the bar, whereby the time of making nut blanks is reduced about 50%.

A further object of the invention is the provision of an improved facing tool attachment which, while it can be used for other purposes, is particularly designed for facing nut blanks and which is simple in construction, easily operated and highly efficient in use, as has been actually demonstrated in practice, whereby the time of making nut blanks is very materially reduced, so that a larger number of such blanks can be turned out in a given time than has heretofore been possible.

In the drawings accompanying and forming a part of this specification, Fig. 1 is a side perspective view illustrating so much of a multiple spindle machine as is necessary to show the present attachment applied thereto; Fig. 2 is a detail view of this improved attachment with the facing tool in position facing the nut and the cutting tool shown in dotted line cutting the blank off; Fig. 3 is a somewhat similar view illustrating the facing tool backed off and the nut blank cut off; Fig. 4 is a right hand end view of the attachment shown in Fig. 2; and Fig. 5 is a detail view of a different means for operating the nut facing tool.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

In the present instance the nut facing attachment is shown applied to a multiple spindle screw machine of the well-known "Gridley" type, which has a rotary or indexible turret 2 carrying rotary work or stock spindles 3, a cut-off slide 4 and cutting-off tool 5, suitable means being provided for shifting this cut off tool slide to and from the work or stock carried in the spindles 3.

Suitably supported on a shaft 6 is a main sliding tool carrier 7 which is shifted back and forth by suitable cam means carried on a cam shaft (not shown).

On the several tool supporting faces of this sliding tool carrier 7, the necessary tools and tool holders 8 are bolted. In place of one of these tool holders 8 this improved facing attachment is used. This comprises a bracket or tool holder 9 having a support or saddle 10 adjustably bolted to the sliding tool carrier. Carried by this bracket 9 is a sliding rod or tool support 11 having a tool holder 12 at its forward end for the reception of a facing tool 13. This rod is held in its forward position by means of a spring 14 located between the bracket 9 and the tool holder 12, the rod 11 being supported in a suitable hub or bearing 15 projecting forwardly of the bracket 9 and upon which hub the spring 14 is located.

A stop rod 16 is adjustably connected to a sliding sleeve or holder 17 mounted in the top of the bracket 9, this stop rod being in position to strike against either the frame of the machine or the work spindle carrier at a predetermined time in the forward movement of the main tool slide 7. Both the sleeve 17 carrying the stop rod 16 and the facing tool rod 11 slide in the bracket 9, which latter is bolted to and moves with the main tool slide 7. The bracket 9 is provided at its upper side with a rearwardly extending arm 18 carrying a pin 19 and a similar pin 20 is located in the rear end of the facing tool rod 11. Cooperating with these pins is a pivotally supported lever 21 mounted on a block or member 22 secured at its upper end to the rear end of the sleeve 17 and having its lower end shaped to project into an elongated slot of the rod 11. There is a certain amount of play between the two pins 19 and 20 and the lever 21 and this is regulated by means of a set screw 23 and check nut 24, the former being adjustable to engage the bracket 9.

In the operation of this improvement as the main tool slide 7 advances the facing cutter 13 is carried forward into contact with the work and faces off a few thousands thereof, this facing operation continuing until the forward end of the stop rod 16 strikes against the spindle carrier or the frame of the machine, which then pushes back the sliding sleeve 17 and thereby the lever supporting block 22 which is connected with such sliding sleeve 17 and projects into the slot of the tool support 11 to engage such rod, thereby stopping the forward movement of the tool support or rod 11 and holder 12. As the lever 21 is carried by this block 22 it follows that the engagement of this lever 21 with the pin 19 of the bracket 9 causes the upper end of the lever to move forward and the lower end thereof rearward at an accelerated speed to bring the lower end thereof into engagement with the pin 20 carried by the facing tool rod 11, thereby forcing the facing tool rod 11 and the facing tool rearwardly, which is permitted by its elongated slot, at twice the rate of speed of the main tool slide advance, so that at this time as long as the main tool slide 7 advances the facing cutter 13 continues at the same accelerated rate of speed to back away from the work, thus allowing the cutting off tool to cut off the piece and the blank to drop out of the way. This accelerated speed is due to the fact that the throw of the lever 21 is multiplied when the upper end thereof strikes the pin 19.

At the instant the travel of the facing tool 13 is stopped, owing to the amount of play between the two pins 19 and 20 and the lever 21, the facing tool 13 is permitted to bear against the work and face the piece so that the cut is permitted to run out and does not leave any mark on the work, and when the play or space between the two pins and the lever is finally taken up, the facing tool then commences to back away from the work at an accelerated speed.

During this facing operation the cutting tool 5, see Fig. 2, is cutting off the blank so that by means of the present improvement work on the end of the blank and the cutting off of the blank is accomplished at one and the same time, this very materially saving time and therefore materially reducing the cost of making nut blanks.

Instead of using the lever 21 the same result could be obtained by means of a rack and gear mechanism such as that shown in Fig. 5, in which a rack bar 25 is substituted for the arm 18 and pin 19, this rack bar being carried at the upper end of the bracket 9, a similar rack 26 being carried by the facing tool rod 11 instead of the pin 20 and between these racks is located a rolling gear or pinion 27 in place of the lever 21, this gear being pivotally connected to the block 28 fixed to the sliding sleeve 17 so that as the sleeve 17 is shifted backwardly the gear is caused to rotate or roll relatively to the rack 25 thereby shifting the rack 26 and the facing tool rod 11 rearwardly at an accelerated speed and in fact twice as fast as the forward movement of the tool slide.

Thus, it will be observed that the facing tool or other end working tool in both forms moves forward to the work at the same speed as the main tool slide but that it returns from the work at twice the speed of advance of the tool slide, while at the same time, the facing work can be done during the cutting off of the blank by the cutting tool.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. The combination of a sliding main tool carrier, a tool holder mounted thereon, a sliding tool support carried by said holder, means for stopping the forward movement of said tool support during the continued advance of the main tool carrier, and means cooperating with the tool holder for retracting said sliding tool support.

2. The combination of a sliding main tool carrier, a tool holder mounted thereon, a sliding tool support carried by said holder, means for stopping the forward movement of said tool support during the continued advance of the main tool carrier, and means co-operating with the stopping means and said tool holder for retracting said sliding tool support at an accelerated speed during the advance of the tool holder.

3. The combination of a sliding main tool carrier, a tool holder mounted thereon, a sliding tool support carried by said holder, sliding means for stopping the forward movement of said tool support during the advance of the main tool carrier, and lever means for retracting said sliding tool support.

4. The combination of a sliding main tool carrier, a tool holder mounted thereon, a sliding tool support carried by said holder, sliding means for stopping the forward movement of said tool support during the advance of the main tool carrier, and swinging means for retracting said sliding tool support, at an accelerated speed during the forward movement of the tool holder.

5. The combination of a sliding main tool carrier, a tool holder mounted thereon, a sliding tool support carried by said holder, means for stopping the forward movement of said tool support during the continued advance of the main tool carrier, and means for retracting said sliding tool support, and comprising a pair of pins carried one by said tool holder and the other by said sliding tool support and a pivoted lever cooperating therewith.

6. The combination of a sliding main tool carrier, a tool holder mounted thereon, a sliding tool support carried by said holder, sliding means for stopping the forward movement of said tool support during the advance of the main tool carrier, and means for retracting said sliding tool support at an accelerated speed during the forward movement of the tool holder, and comprising a pair of pins carried one by said tool holder and the other by said sliding tool support, and a pivoted lever cooperating therewith.

7. The combination of a sliding main tool carrier, a tool holder mounted thereon, a sliding tool support carried by said holder for the reception of a facing tool, sliding means for stopping the forward movement of said tool support during the advance of the main tool carrier, and means for retracting said sliding tool support and its facing tool at an accelerated speed during the forward movement of the tool holder and comprising a pair of pins carried one by the tool holder and the other by the facing tool support, and a lever cooperating with said pins and pivotally connected to said sliding stop means.

8. The combination of a sliding main tool carrier, a tool holder mounted thereon, a slotted sliding tool support carried by said holder for the reception of a facing tool, means slidingly supported by the tool holder for stopping the forward movement of said tool support during the advance of the main tool carrier, means connected to the sliding stop means and projecting into the slot of the tool support, a pin carried by the tool holder, a pin carried by the tool support, and a lever pivotally connected to said connecting means and cooperating with said pins for retracting said sliding tool support at an accelerated speed during the forward movement of the tool holder.

9. The combination of a sliding main tool carrier, a tool holder mounted thereon, a sliding tool support carried by said holder for the reception of a facing tool, sliding means for stopping the forward movement of said tool support during the advance of the main tool carrier, means for retracting said sliding tool support and its facing tool at an accelerated speed during the forward movement of the tool holder and comprising a pair of pins carried one by the tool holder and the other by the facing tool support, a lever cooperating with said pins and pivotally connected to said sliding stop means, a spring located between the tool holder and the end of the tool support, and means for regulating the period of cooperation between the lever and its pins.

10. The combination of a sliding main tool carrier, a tool holder mounted thereon, a sliding tool support carried by said tool holder for the reception of a tool, stop means slidingly supported by the tool holder, connecting means between the stop means and the sliding tool support, means pivotally mounted on said connecting means, means carried by the tool holder and the tool support and cooperating with said pivotally mounted means for retracting the tool support during the continued advance of the tool holder.

11. The combination of a sliding main tool carrier, a tool holder mounted thereon, a sliding tool support carried by said tool holder for the reception of a spring pressed tool, stop means slidingly supported by the tool holder, connecting means between the stop means and the sliding tool support, means pivotally mounted on said connecting means, means carried by the tool holder and the tool support and cooperating with said pivotally mounted means for retracting the tool support during the continued advance of the tool holder at an accelerated speed during the advance of the tool carrier.

12. The combination of a sliding main tool carrier, a tool holder mounted thereon, a sliding tool support carried by said tool holder for the reception of a tool, stop means slidingly supported by the tool holder, connecting means between the stop means and the sliding tool support, means pivotally mounted on said connecting means, means carried by the tool holder and the tool support and cooperating with said pivotally mounted means for retracting the tool support during the continued advance of the tool holder at an accelerated speed during the advance of the tool carrier and comprising a lever pivotally supported midway of its ends.

13. The combination of a sliding main tool carrier, a tool holder mounted thereon, a sliding tool support carried by said tool holder for the reception of a tool, stop means slidingly supported by the tool holder, connecting means between the stop means and the sliding tool support, means pivotally mounted on said connecting means, means carried by the tool holder and the tool support and cooperating with said pivotally mounted means for retracting the tool support during the continued advance of the tool holder at an accelerated speed during the advance of the tool carrier, and comprising a lever pivotally supported midway of its ends, said lever and its cooperating means having a predetermined amount of play.

14. The combination of a sliding main tool carrier, a tool holder mounted thereon, a sliding tool support carried by said tool holder for the reception of a tool, stop means slidingly supported by the tool holder, connecting means between the stop means and the sliding tool support, means pivotally mounted on said connecting means, means carried by the tool holder and the tool support and cooperating with said pivotally mounted means for retracting the tool support during the continued advance of the tool holder at an accelerated speed during the advance of the tool carrier, and comprising a lever pivotally supported midway of its ends, said lever and its cooperating means having a predetermined amount of play, and means for regulating such play.

15. The combination of a reciprocating tool carrier, a tool holder mounted thereon, an independently reciprocating tool support carried by said tool holder for the reception of a tool, an independently reciprocating stop supported by the tool holder, connecting means between the stop and tool support, shiftable means carried by said connecting means, and means carried by the tool holder and tool support and cooperating with said shiftable means for retracting the tool support at an accelerated speed during the advance of the tool carrier.

16. The combination of a reciprocating tool carrier, a tool holder mounted thereon, an independently reciprocating tool support carried by said tool holder for the reception of a tool, an independently reciprocating stop supported by the tool holder, connecting means between the stop and tool support at the rear thereof, shiftable means carried by said connecting means and pins carried by the tool holder and tool support at the rear thereof and cooperating with said shiftable means for retracting the tool support at an accelerated speed during the advance of the tool carrier.

17. The combination of a reciprocating tool carrier, a tool holder mounted thereon, an independently reciprocating tool support carried by said tool holder for the reception of a tool, an independently reciprocating stop supported by the tool holder, connecting means between the stop and tool support, shiftable means carried by said connecting means, means carried by the tool holder and tool support and cooperating with said shiftable means for retracting the tool support at an accelerated speed during the advance of the tool carrier, and means for cutting a blank during the advance of the tool support.

18. The combination of a reciprocating tool carrier, a tool holder mounted thereon, an independently shiftable tool support carried by the tool holder, said tool holder and tool support being shiftable together toward the work, and means carried by said tool holder and cooperating with said tool support for shifting said tool support independently of said tool carrier away from the work at an accelerated speed during the continued advance of the tool carrier.

19. The combination of a reciprocating tool carrier, a tool holder mounted thereon, an independently shiftable tool support carried by the tool holder, said tool holder and tool support being shiftable together toward the work, means for shifting said tool support independently of said tool carrier away from the work at an accelerated speed during the continued advance of the tool carrier and comprising a pivotally mounted member and means cooperating therewith and carried by the tool holder and tool support.

20. The combination of a reciprocating tool carrier, a tool holder mounted thereon, an independently shiftable tool support carried by the tool holder, said tool holder and tool support being shiftable together toward the work, means for shifting said tool support independently of said tool carrier away from the work at an accelerated speed during the continued advance of the tool carrier, and means for cutting a blank during the advance of the tool support.

21. The combination of a reciprocating tool carrier, a tool holder mounted thereon, an independently shiftable tool support carried by the tool holder, said tool holder and tool support being shiftable together toward the work, means for shifting said tool support independently of said tool carrier away from the work at an accelerated speed during the continued advance of the tool carrier and comprising a pivotally mounted member and means cooperating therewith and carried by the tool holder and tool support, and means for cutting a blank during the advance of the tool support.

22. The combination of a reciprocating tool carrier, a tool holder mounted thereon, an independently shiftable tool support carried thereby, said tool carrier and tool support being shiftable together toward the work, means for shifting said tool support independently of said tool carrier away from the work at an accelerated speed during the continued advance of the tool carrier and comprising a shiftable stop lever, a pivotally mounted lever connected therewith and means cooperating therewith and carried by the tool holder and tool support, and means for cutting a blank during the advance of the tool support.

23. The combination of a main tool slide, a pair of sliding members carried thereby one adapted to carry a tool and the other a stop, said members being movable together with said tool slide and also relatively to each other, and means cooperating with both of said sliding members whereby on the stoppage of one sliding member the other is retracted during the forward movement of the main tool slide.

24. The combination of a main tool slide, a pair of sliding members carried thereby one adapted to carry a tool and the other a stop, said sliding members being movable together with said tool slide and also relatively to each other, and means cooperating with both of said sliding members whereby on the stoppage of one sliding member the other is retracted at an accelerated speed as compared with and during the forward movement of the main tool slide.

25. The combination of a main tool slide, a pair of sliding members carried thereby one adapted to carry a tool and the other a stop, said members being movable together with said tool slide and also relatively to each other, and means connected with said stop carrying member and cooperating with said tool carrying member whereby on the stoppage of one of said members the other is retracted at an accelerated speed as compared with and during the forward movement of the main tool slide.

26. The combination of a main tool slide, a stop carrying holder movable with the slide, said slide having movement relative to said stop carrying holder, a tool carrying holder also movable with said slide and having movement independently thereof, and cooperating means to retract the tool holder during the advance of the main tool slide.

27. The combination of a main tool slide, a stop carrying holder movable with the slide, said slide having movement relative to said stop carrying holder, a tool carrying holder also movable with said slide and having movement independently thereof, and cooperating means to retract the tool holder during the advance of the main tool slide at an accelerated speed.

Signed at Windsor, Vermont, this 14th day of July, 1926.

EARL H. WHEELER.